(12) United States Patent
Ames et al.

(10) Patent No.: US 7,246,789 B2
(45) Date of Patent: *Jul. 24, 2007

(54) CABLE CLAMPING APPARATUS AND METHOD

(75) Inventors: William Matthew Ames, Carmichael, CA (US); Jeremy Daniel Wheaton, La Crescenta, CA (US)

(73) Assignee: Rectorseal Corporation, Houston, TX (US)

( * ) Notice: Subject to any disclaimer, the term of this patent is extended or adjusted under 35 U.S.C. 154(b) by 81 days.

This patent is subject to a terminal disclaimer.

(21) Appl. No.: 11/068,386

(22) Filed: Mar. 1, 2005

(65) Prior Publication Data

US 2006/0011899 A1    Jan. 19, 2006

(51) Int. Cl.
*B66F 3/00* (2006.01)

(52) U.S. Cl. .............................. 254/134; 254/134.3 FT; 254/134.3 R (58) Field of Classification Search ......... 254/134.3 R, 254/134.3 FT, 134.6, 134
See application file for complete search history.

(56) References Cited

U.S. PATENT DOCUMENTS

| 524,035 A | 8/1894 | White |
| 2,231,919 A | 2/1941 | Kent .......................... 287/103 |
| 3,727,967 A | 4/1973 | Anastasiu et al. ....... 294/86.31 |
| 3,906,619 A | 9/1975 | Shaffer ........................ 29/517 |
| 4,368,910 A | 1/1983 | Fidrych ........................ 294/86 |
| 4,453,291 A | 6/1984 | Fidrych ........................ 24/115 |
| 4,736,978 A | 4/1988 | Cielker .......................... 294/90 |
| 5,245,730 A | 9/1993 | Martin ......................... 24/132 |
| 5,283,930 A * | 2/1994 | Krauss ..................... 24/129 R |
| 5,513,555 A * | 5/1996 | Plank et al. .................... 92/19 |
| 5,868,060 A * | 2/1999 | Plank et al. .................... 92/19 |
| 6,471,268 B1 | 10/2002 | Stenstrom et al. ............ 294/15 |
| 6,883,782 B2 * | 4/2005 | Ames et al. ........ 254/134.3 FT |
| 2004/0041136 A1 * | 3/2004 | Ames et al. ........ 254/134.3 FT |
| 2005/0242331 A1 * | 11/2005 | Ames et al. ........ 254/134.3 FT |

* cited by examiner

*Primary Examiner*—Lee D. Wilson
(74) *Attorney, Agent, or Firm*—Jones & Smith, LLP; E. Randall Smith (57) ABSTRACT

An embodiment of the invention involves a method for engaging an elongated item, such as a wire or cable, to allow it to be pulled through a path, such as in a conduit, and includes gripping the elongated item with multiple teeth.

27 Claims, 7 Drawing Sheets

CABLE CLAMPING APPARATUS AND METHOD

PRIORITY

This application claim priority to U.S. patent application Ser. No. 10/405,083 filed Apr. 2, 2003 and issued as U.S. Pat. No. 6,883,782 on Apr. 26, 2005, and also claims priority to the provisional patent application Ser. No. 60/407,559 filed Aug. 30, 2002, entitled "Snagger", the disclosure of which is hereby incorporated by reference.

FIELD OF THE INVENTION

The invention relates to the field of releasably clamping and pulling elongated items such as, for example, wires and cables. More particularly, the apparatus relates to an apparatus and method for releasably clamping the end of an elongated item such as a wire or cable for the purpose of pulling the wire or cable through a path such as, for example, a path defined by a conduit.

BACKGROUND OF THE INVENTION

There are many circumstances in which it is desirable to releasably grasp the end of an elongated item so that it can be pulled along a path, such as, for example, through a length of conduit. In the electrical and telecommunication industries, for example, it is common for one or more cables or wires to be pulled through a conduit that will provide a path for the wires. These circumstances arrive particularly in the case of copper power and telecommunication wires, but they also occur with fiber optic cables, or any other type of cable or wire. Tho wires or cables are typically run through a path formed by a conduit that provides to the wire or cable structural protection as well as protection from environmental factors such as moisture. The conduits can include, for example, typical metal or plastic type conduits which run throughout buildings. Other examples include metal or plastic conduits that run in building foundations and underground, overhead conduits, and even various conduits found inside vehicles such as aircraft. Conduits may also run overhead through power poles or up and down the length of power poles.

Depending on the circumstances, one or even a large number of wires or cables, referred to hereinafter as "lines" maybe ultimately run through a conduit. For example, in the case of telephone lines, up to three to five hundred pairs of lines may be found resulting in one cable that is one inch in diameter. The range of conduits found in industry is quite wide, and includes, by way of example only, typical conduits from 2 inches up to 6 inches. Wires ranging for example from number 6 copper to 750 mcm copper are often found. In some cases, the copper wire will be a twisted copper wire having a relatively thin insulation surrounding the copper which itself is surrounded by ABS plastic sheathing. Aluminum wires may have a similar two layer insulation and sheathing.

Since splicing the ends of wires together can be difficult and time consuming, in telecommunications it is typically desirable to run the longest single length of line possible at a time. In many circumstances the length of line, or "run" is typically made anywhere in the range from 20 feet to 1800 feet. Also, the typical distance between junction boxes in a conduit system is 150-300 feet, so runs of at least this length are very common.

One circumstance that frequently occurs is the need to pull four electrical lines an at the same time, comprising three or four electrical lines deeding on the electrical configuration, and one typically smaller ground line. These four electrical lines are often required to be pulled through a steel conduit in the form of a pipe in a building or a PVC plastic pipe underground.

In some instances when performing such a pull, the distance of the pull can become quite significant, and the force of the pull can be on the order of 500-700 pounds per line, resulting in a total pull stress of 2,000-3,000 pounds. Thus, it is desirable for a clamping system which clamps onto the end of the line being pulled to be able to accommodate the necessary force for the application.

One approach to gripping the end of a cable for a pull has been a type of clamp which uses a body that receives the end of the wire and holds it between two opposed but offset set screws. A clamp of this type is used on each wire separately where multiple wires are pulled at once. A disadvantage of this system is that the time required for insertion of the wire and proper tightening of the set screws in order to achieve satisfactory pulling can be relatively long. Moreover, if an operator does not spend sufficient time with the set screw process, or is not properly trained in setting up the system, wires may tend to slip out of the system. Moreover, some form of tightening tool such as a hex wrench is required to be present both for tightening the set screws and loosening them after the pull has been completed.

Another type of cable clamping arrangement is a basket type grip having a woven mesh that tightens around the line upon pulling force in a fashion similar to a Chinese finger puzzle. When a group of cables is to be pulled, they are typically all wrapped together and pulled by a single length of mesh. In order to provide proper gripping force, this system requires the mesh to be significantly elongated in order to have sufficient frictional force. Since the gripped length of wire typically needs to be discarded, this method can lead to a greater waste of the end of the cable than the set screw apparatus. Moreover, this system requires typically even more time and attention to attach to the end of the line or lines than the set screw device described above.

Accordingly, it would be desirable to have an apparatus and method that can conveniently and securely clamp on the end of an item to be pulled through a path such as a conduit It would also be desirable to have such a device that can provide an adequate pulling force as needed in industry. Further, it would be desirable to have such a device that can rapidly and conveniently be used without necessarily requiring an additional tool for the attachment and release steps. Further, it would be desirable for the device to be durable and reusable.

SUMMARY OF THE INVENTION

The foregoing needs are met, to at least to a great extent, by the present invention, which provides an apparatus and method for releasably clamping elongated articles such as wires or cables. In some embodiments, the invention provides an apparatus and method that can conveniently and securely clamp on the end of a line to be pulled through a path such as a conduit, and that can rapidly and conveniently be used without necessarily requiring an additional tool for the attachment and release steps.

In accordance with one aspect of the present invention, an apparatus for releasably clamping onto the end of an elongated item has a main body having a bore therethrough, and a plurality of pivoting teeth pivotedly mounted to the main body and projecting generally inward into the bore.

In accordance with another embodiment aspect of the present invention, an apparatus for releasably clamping onto the end of an elongated item, has a main body having a bore therethrough, and pivoting means for gripping the item pivotedly mounted to the main body and projecting generally inward into the bore.

In accordance with yet another aspect of the present invention, a method for pulling an elongated item through a path, includes inserting an end of the item into the bore of a body having pivoting teeth projecting generally radially inward in the bore, applying a pulling force to the item so that the pivoting teeth clamp on the item apply a resistive force in the pulling direction to pull the item, maintaining the pulling force to pull the item along the pat, cutting the pulled end of the item off to form a cut end, and displacing the cut end of the item through the bore in the direction of original insertion to eject the cut end from the body.

There has thus been outlined, rather broadly, certain embodiments of the invention in order that the detailed description thereof that follows herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be under that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the preset invention. It is important, therefore, that the claims be regarded as including such equivalent constructions insofar as they do not depart from the spirit and scope of the present invention.

DETAILED DESCRIPTION OF THE INVENTION

Preferred embodiments of the present invention provide an apparatus and method for releasably clamping elongated items such as wires or cables. Some embodiments of the invention can conveniently and securely clamp on the end of a line to be pulled through a path such as a conduit, providing adequate pulling force as needed in industry. The clamping device that can rapidly and conveniently be used without necessarily rig an additional tool for the attachment and release steps. Further, some embodiments of the device are durable and reusable. A preferred embodiment of the invention will now be described with reference to the drawing Figures, in which like reference numerals refer to like elements throughout.

Figure 1:
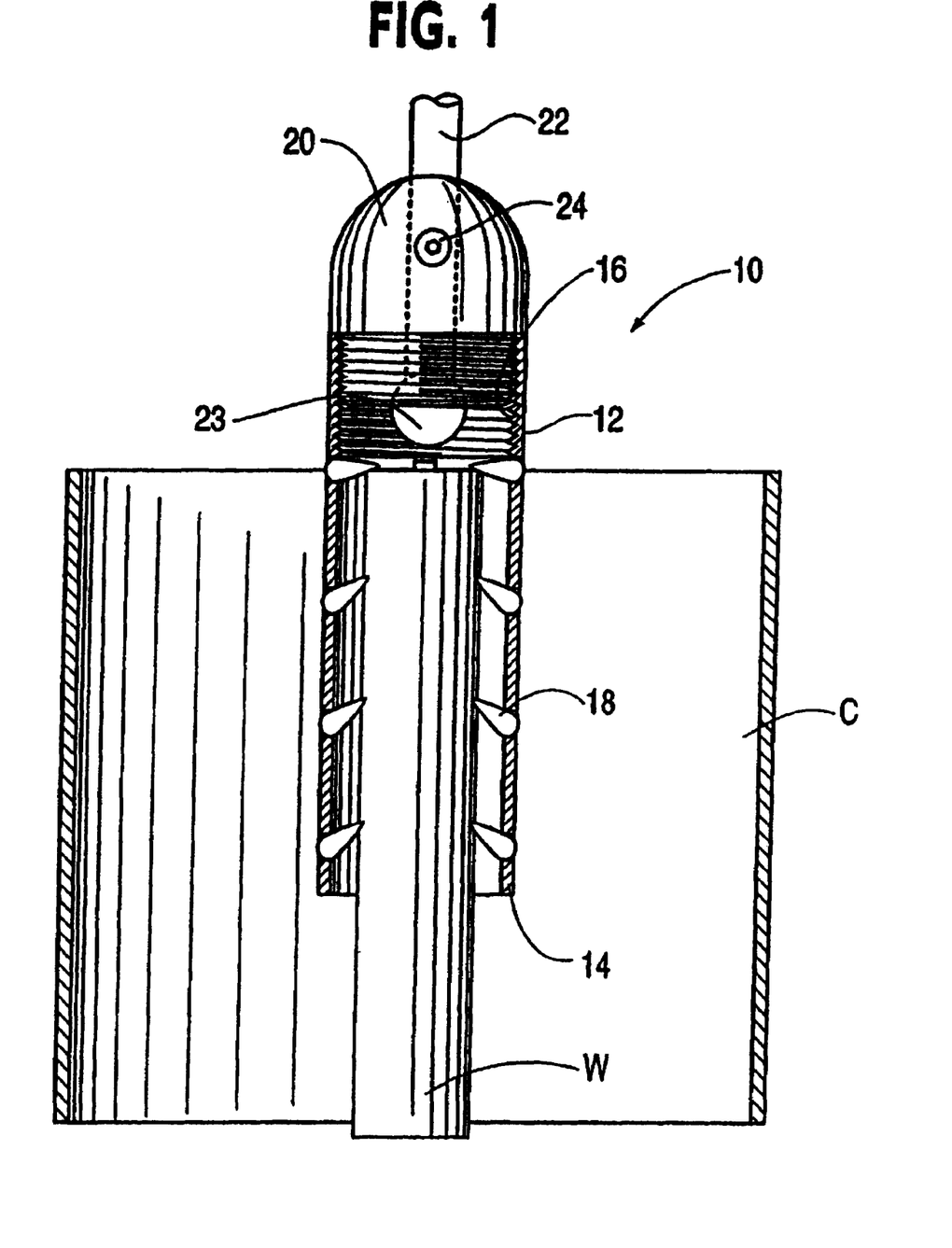
FIG. 1 is a cutaway view showing a clamp device according to a preferred embodiment of the present invention clamped onto the end of a line being pulled through a conduit.
Figure 3:
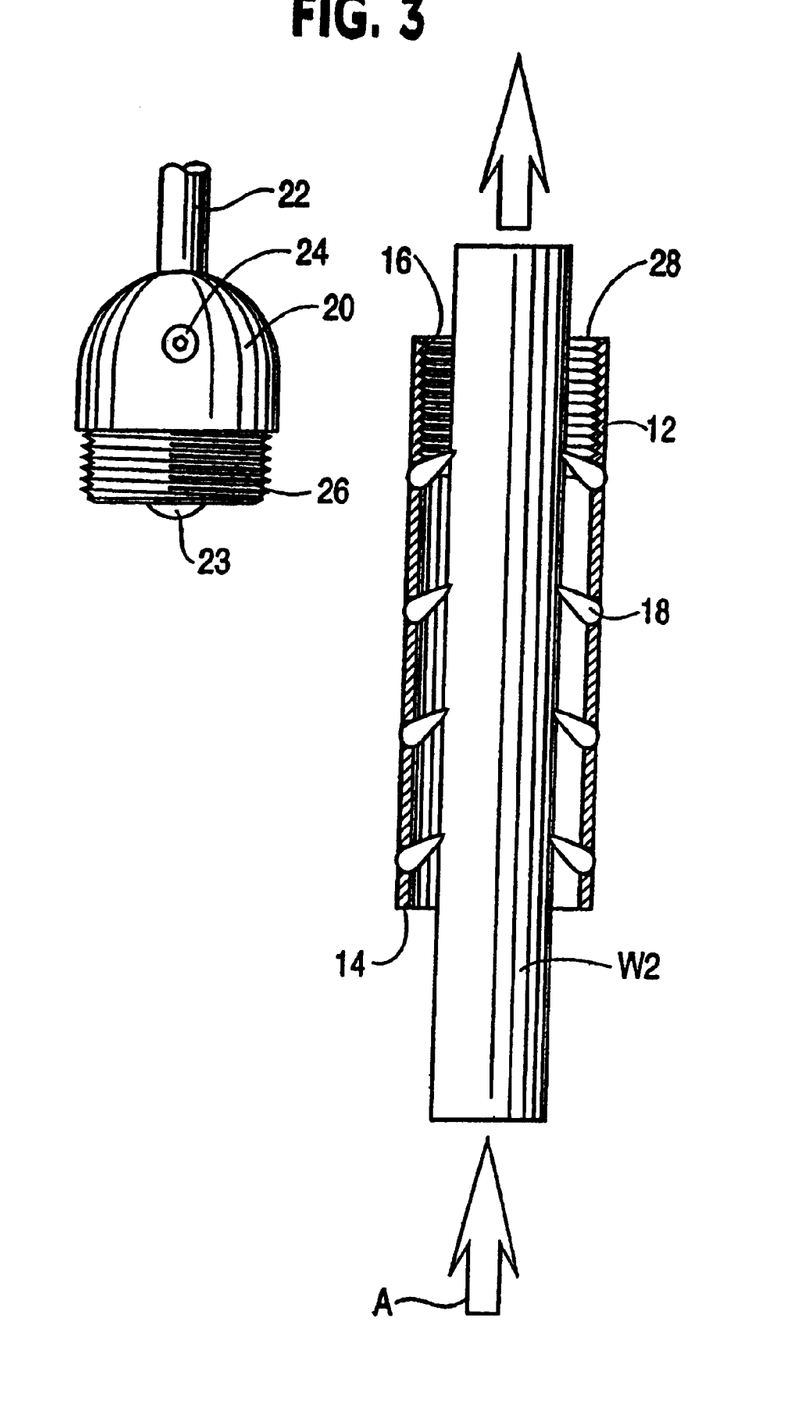
FIG. 3 is a disassembled cutaway view showing a cap portion of the clamp disassembled from a body portion so that the cut end of the line can be pushed out one end of the body of the clamp.
Figure 4:
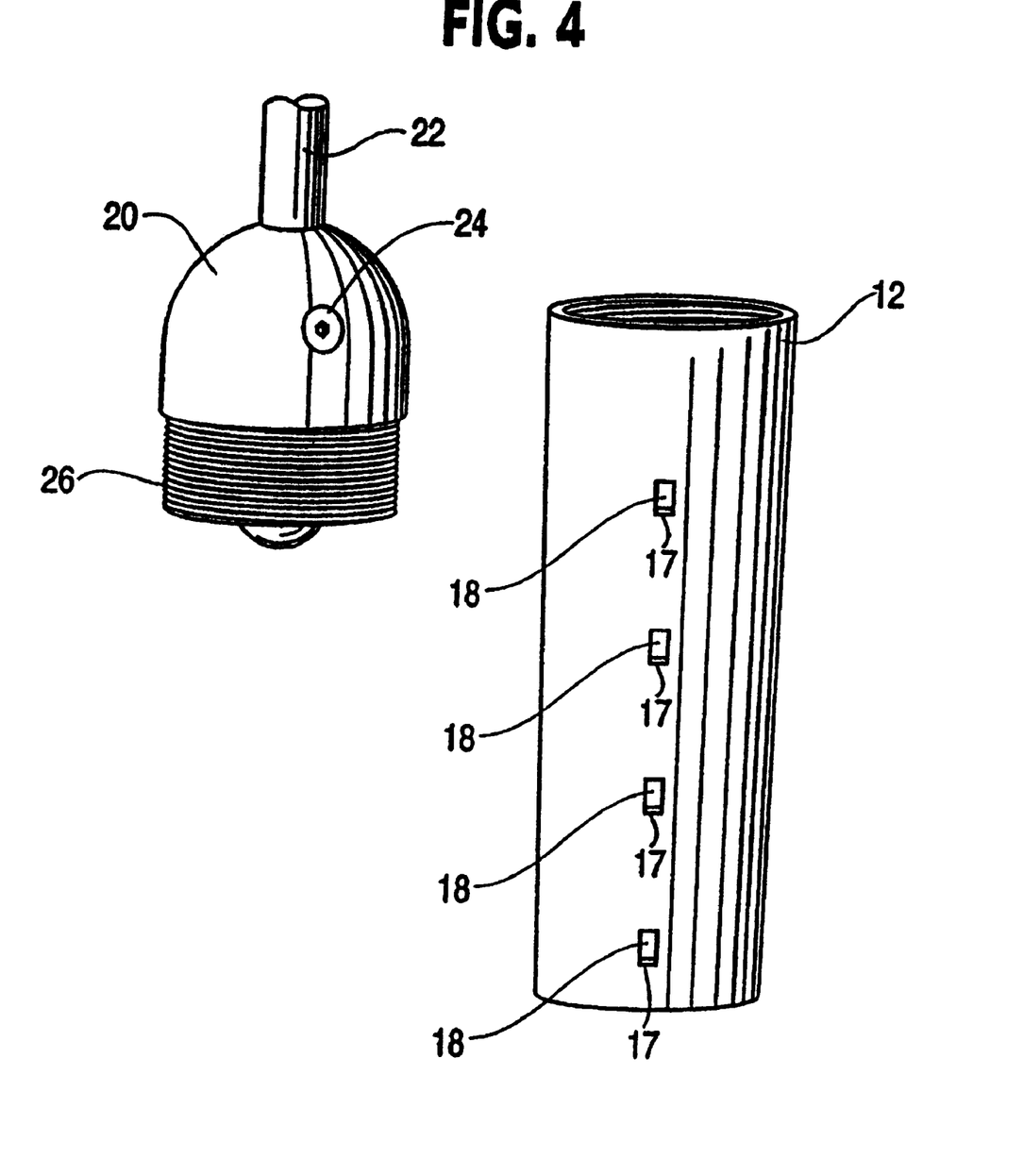
FIG. 4 is a disassembled perspective view of the cap and body of the clamp.
Figure 7:
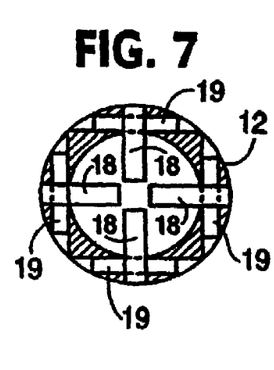
FIG. 7 is a cross-sectional view taking through line 7-7 in FIG. 6.
Figure 8:
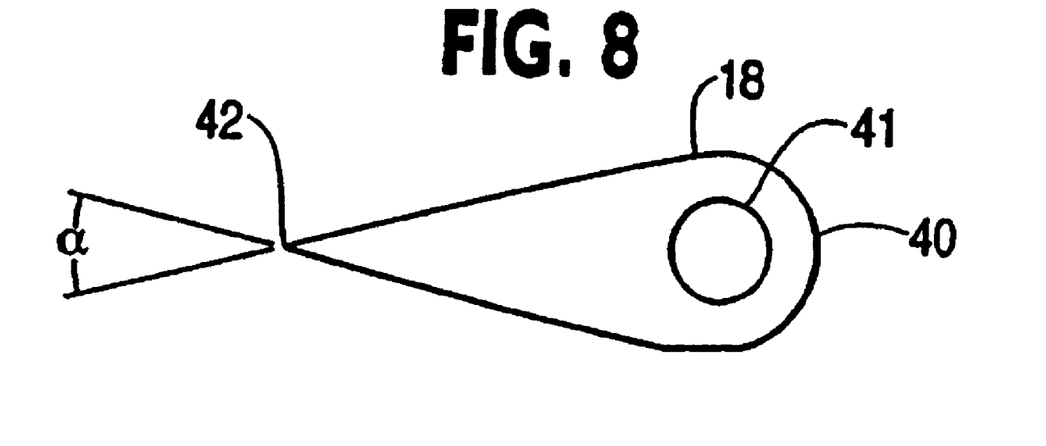
FIG. 8 is a side view of a tooth.
Figure 9:
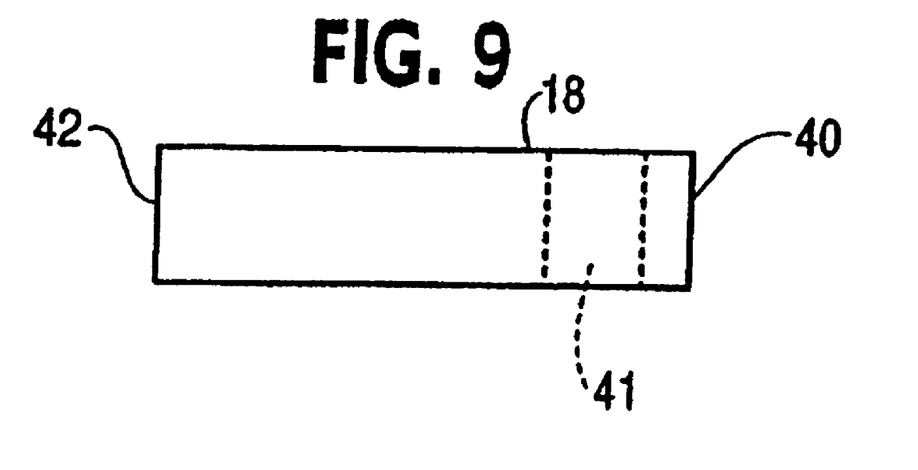
FIG. 9 is a top view of the tooth of FIG. 8.

Referring now particularly to FIGS. 1 and 3, a clamping device 10 is illustrated which has a cylinder body 12. The cylinder body 12 has a first open end 14 and a second internally threaded open end 16. Continuing with FIG. 1 but also referring to FIGS. 6 and 7, a number of pivoting teeth 18 are arranged in circumferential rings spaced from axially each other. The teeth 18 project generally inwardly from the cylinder body 12, and are mounted within slots 17 which penetrate entirely through the walls of the cylinder body 12. The pivoting teeth 18 are each retained by a pin 19 to pivot around the pin 19. Slots 17 are elongated and the rear or radially outwardmost portion of the pivoting tooth 18 move within the elongation of the slot 17 during pivoting of the respective tooth 18. The rear portion 40 of a tooth 18 is seen in FIGS. 8 and 9. The bore 41 in the tooth 18 receives the pin 19.

If the pulling device 10 is oriented generally vertically as shown in FIG. 1, the teeth 18 will tend to fall to a downward or radial inwardmost resting position. The teeth 18 are limited in their downward travel by the contact interference of the rear or radially outward most portion 40 of the tooth 18 with the end of the slot 17. The resting place angle is preferably approximately 15 degrees relative to the plane perpendicular to the cylinder body 12. However, it will be appreciated that the resting angle could be greater or lesser. It is generally preferred that the resting angle be selected such that insertion of wire W, as shown in FIG. 1 will cause the teeth 18 to pivot in the direction of insertion, such as upward as shown in FIG. 1.

Returning now to particularly FIG. 1, when a wire W is inserted in the open end 14 of the body 12, as it passes each row of teeth 18 it will displace the teeth 18 slightly in the direction of insertion (upward in FIG. 1) and the inward tips of the teeth 18 will ride along the outer surface of the wire W. Once the wire W has passed one or more rows of teeth 18, any force in the opposite direction to the insertion direction (downward in FIG. 1) will cause the tips of the teeth 18 to Frictionally engage with the outer surface of the wire W. Frictional contact will cause the teeth 18 to tend to pivot downward and thus grip or clamp onto the wire W and resist any pulling of the wire W in this opposite direction. Further, due to the angled condition of the teeth 18 as they are gripping the wire W, pulling forces are converted into a force having an inward component which tends to cause the frictional fit to become greater as the pulling force increases.

Figure 2:
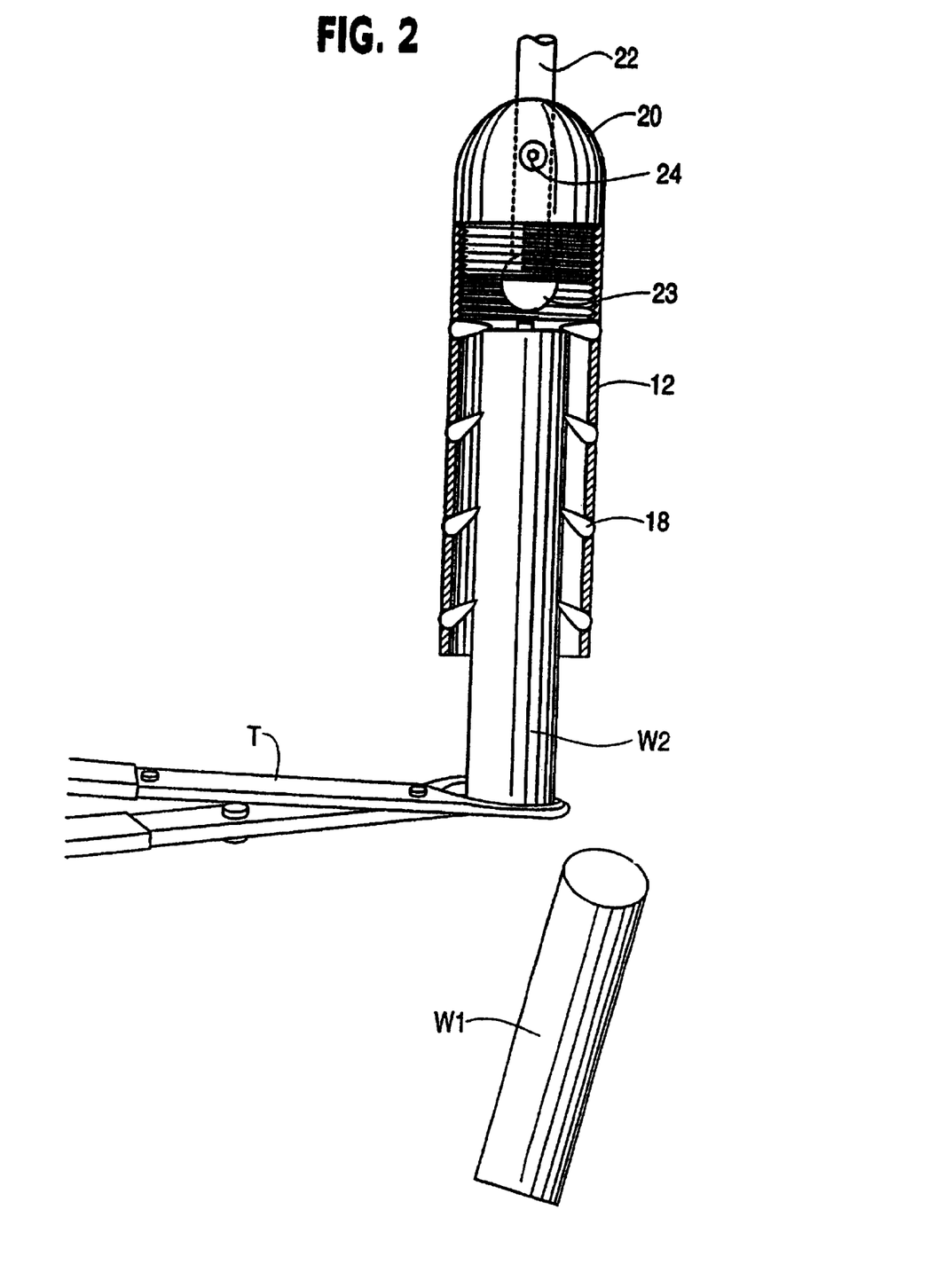
FIG. 2 is a cutaway view showing the end of the line being clamped while it is being cut off from the remainder of the line after having been pulled completely through the conduit.
Figure 6:
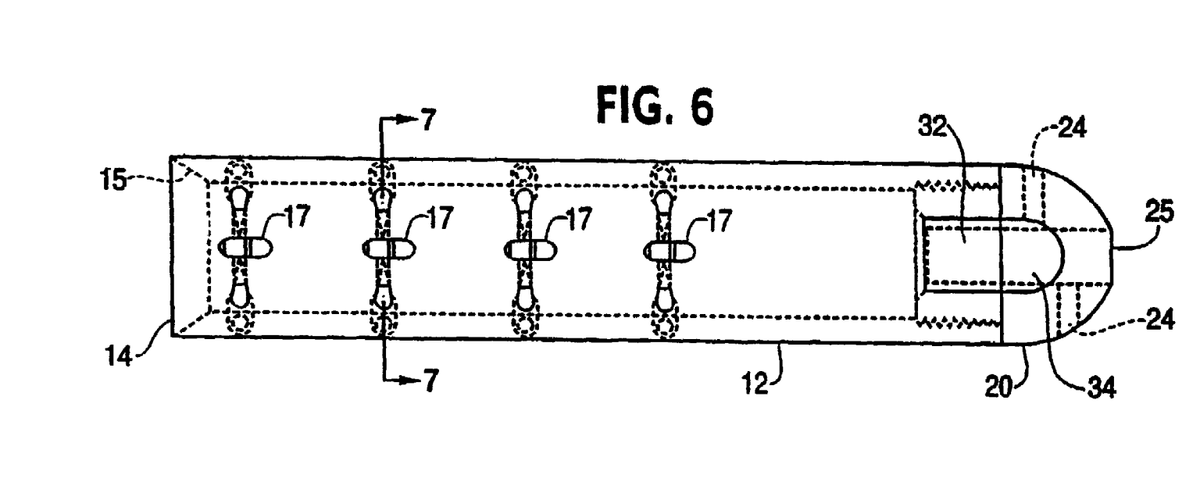
FIG. 6 is a side view, including hidden lines, of the cylindrical body and cap of the device assembled together.

Thus, it will be appreciated that the actual gripping and pulling forces are transmitted from the pivoting teeth 18 to the pins 19 and thus into the body 12. As shown by FIGS. 2, 6 and 7, resistance of the pins use of the teeth 18 to any further pivoting or release of the wire W is provided by the geometry imposed by the teeth 18 and pins 19. Thus, it is not necessary that any interference between the back end 40 of the teeth 18 (see FIGS. 8 and 9) and the edge of the slot 17 directly occur. Accordingly, although interference between the back end 40 (see FIGS. 8 and 9) of the teeth 18 and the slot 17 is used to define the resting position of the teeth, such interference is not necessarily needed for the pulling force resistance. Alternatively, the teeth 18 can be provided with a lobe that contacts the inner wall of the body 12 to resist excessive pivoting, and therefore resist pulling forces.

The teeth 18 may preferably have some degree of sharpening at their tip 42 (see FIGS. 8 and 9) so that they tend to dig to some extent into the outer surface of the wire W. FIGS. 8 and 9 illustrate a teeth 18 having the radially outwardmost portion 40 that interferes with the slot 17 to locate the resting position, and a sharp tip 42 having a tip angle and to provide grip. The sharpened tip 42 enhances the ability of the teeth 18 to provide a force. However, it will be appreciated that substantial penetration or digging into the wire W in many instances will not be required, and that the tips 42 at the teeth 18 may have other suitable features and/or surface treatments for providing a frictional force against the outer surface of wire W. Because in many instances the gripped end of the wire is simply discarded after the pull, however, any damaging effect on the wire at the location of the teeth 18 is not necessarily an undesirable result.

Returning now to FIGS. 1-4, the pulling device 10 further has a removable cap 20. The cap 20 provides connection to a wire rope 22, which may have a loop or other connector at its end distal from the cap 20. The affixing of the ball 23 to the end of the wire rope 22 can be accomplished by process as known in the art. In some instances, the wire rope 22 may be provided with a ball 23, a knob, or some other suitable gripping feature, which is larger than a bore 25 which is provided through the end of the cap 20 and through which the rope 22 passes. The wire rope 22 is further held to the cap 20 by for example, a pair of set screws 24 which may be opposed from each other and tightened and connected on to the end of the wire rope 22. The set screws are preferably allen headless type set screws. In this instance, the set screws 24 are not required to resist the pulling force, but rather if tightened will serve to prevent rotation about the longitudinal axis of the wire rope relative to the cap 20. When pulling is performed with the set screws 24 loosened, then the device 10 will be free to rotate relative to the wire rope 22, so that undesirable twisting will not be imparted to the wires being pulled. This helps avoid possible shearing of the wires. However, the set screws 24 can be tightened to prevent the axial rotation of the clamping device about its axis, when desired, for example when retrieving a single line.

The cap 20 has an externally threaded end 26 which mates with the internal threads 16 of the cylinder body 12. Turing now to FIG. 6, the sides of the cap 20, and the sides of the threaded end 16 of the body 12, may be provided with respective opposed flats to facilitate gripping of these two items by wrenches in order to tighten and loosen the cap 20 on to the cylinder body 12.

Some aspects of the method of operation of the clamping device 10 will now be described, with particular reference to FIGS. 1-4. Initially, a user begs with the device 10 configured as shown in FIG. 1 (but without any wire inserted) with the cylinder body 12 fully threaded onto the cap 20. The pulling wire rope 22 at this stage is extending out of the cap 20 and may or may not be attached to a tugging device which will provide motive force for the eventual tugging. With the pulling device arranged as in FIG. 1 (but without any wire inserted), the end of the wire W to be pulled is then inserted, preferably as far as possible, into the interior of the cylinder body 12 through the end 14. This causes the teeth 18 to pivot in the direction of the insertion into the condition shown in FIG. 1. In this condition, the pivoting teeth 18 will resist the pulling force that would tend to pull the wire W out of the device 10, and so tugging on the pulling wire rope 22 effectively pulls the wire through the conduit C. If not already so connected, the pulling wire rope is connected to a material tugger if necessary and pulling force is applied to pull the wire through the path in the conduit. FIG. 6 also illustrates the open end 14 of the cylinder body 12 having a tapered entrance, which facilitates smooth insertion of the wire W.

As shown in FIG. 2, once the pulling is complete and the wire W is now in the free space outside the other end of the conduit, the wire W can be cut generally by a tool T such as a conventional wire cutter. This will leave an end of the wire W1 in a freshly cut and substantially undamaged condition and ready for splicing or connection to another item. The cut off end W2 will tend to stay held by the pulling device 10 because of its contact with the pivoting teeth 18. To remove the cut end W2 from the pulling device 10, a preferable step is to unscrew the cap 20 off of the body 12, and then push the cut end W2 in the direction shown by the arrow A. In some instances, the unscrewing of the cap 20 may be done with hand pressure. In other instances, a tool such as a wrench may be needed and is particularly suitable where flats are provided, such as flat 32 on the cylindrical body 12 and flat 34 in the cap 20 as shown in FIG. 6.

Returning to FIG. 3, the pushing on he wire end W2 in direction A may often be accomplished simply by orienting the cylinder body 12 so that the direction A downward so that the force of gravity on the wire end W2 will cause the wire end W2 to fall out. In other instances, hand pressure at the end of W2 may be required to overcome any residual frictional gripping on the wire, and in other instances pushing with a tool or similar steps maybe employed to free the wire W2. Once the wire end W2 has been ejected, the pulling device 10 is in the configuration shown in FIG. 4, and is ready for the cylinder body 12 to be reattached to the cap 20 so that the clamping device 10 may be reused.

The illustrated embodiment has sixteen pivoting teeth 18, arranged in four bands of four teeth each. This number of teeth has been found preferable for certain sizes of wires and expected pull lengths and pull resisting forces. For example, this number of teeth is suitable for certain applications ranging from number 4 copper wire to 250 mcm copper wire with pulling forces up to 1,000 pounds per wire being pulled. However, it will be appreciated that different numbers of pivoting teeth, including different numbers of circular bands, and different numbers of radially spaced teeth within a band, may both be advantageously employed. The number of teeth employed around a single band preferably is even number so that pairs of teeth are directly opposed to each other, but odd numbers of teeth may also be advantageously employed.

It will be appreciated that the pivot sweep of the teeth 18 will permit a device 10 of a certain size, having a certain diameter of cylinder body 12, to accommodate at least to some degree a range of sizes of wires W to be pulled. For a given size device 10, different sizes or diameters of wires W to be pulled will involve the teeth 18 having a different gripping angle during the pulling process. The gripping angle for optimum pulling force is generally approximately 45 degrees between the axis of the tooth and the sidewall of the wire W, however, many embodiments of the invention can perform their function at angles both greater and less than a 45 degrees gripping angle.

Figure 5:
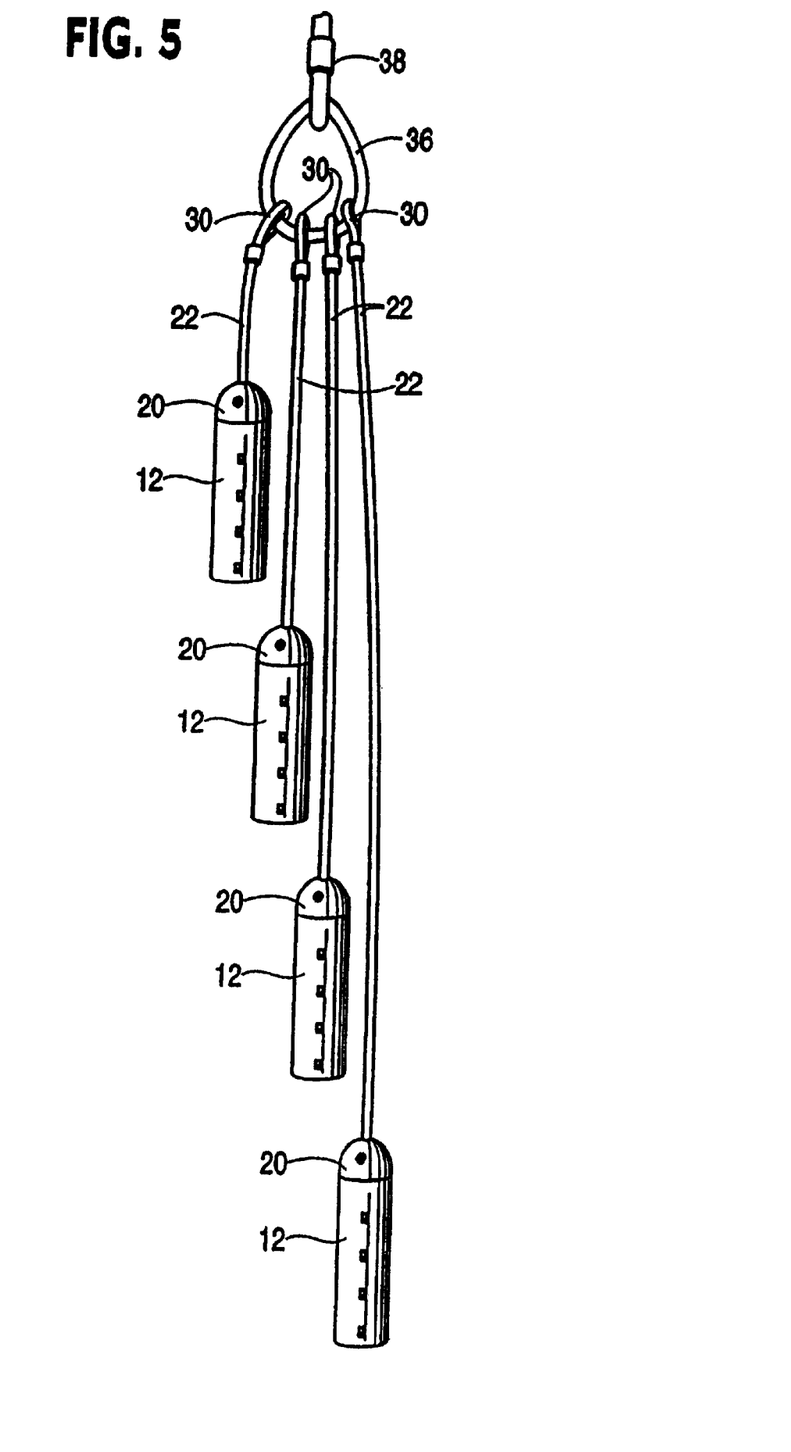
FIG. 5 is a perspective view showing four clamps according to an embodiment of the present invention attached to a common carabiner which is pulled by a tugger.

FIG. 5 illustrates an exemplary arrangement in which four clamping devices 10 are used. In the case of pulling four wires at once, the four clamping devices 10 are each connected by a respective wire rope 22 to a single loop or carabiner 36, so that all of the devices 10 are pulled at the same rate. Regardless of the number of devices 10, in the case of the electrical industry, is common for the devices to be pulled or tugged by a tugging line 38. In some cases this tugging line 34 may be attached to a power operated take-up roll by a power-operated device that can provide the pulling force necessary. FIG. 5 illustrates an example where the clamping devices 10 are staggered so that the diameter of the conduit needs to be only be somewhat larger than the diameter of one of the devices 10. Thus, the conduit need only accommodate the diameter of a single device 10 and the three other wire ropes 22 in the illustrated embodiment.

Although an example of the device is shown pulling a wire it will be appreciated that other items can be gripped. Also, although the device is useful to pull through conduit it can also be used to pull items through other paths and/or in other industries.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A method for pulling an elongated item through a path, the method comprising:
   inserting an end of the item into the bore of a body having a plurality of pivoting teeth projecting generally radially inward in the bore mounted at multiple locations;
   applying a pulling force to the item so that the pivoting teeth clamp on the item and prevent movement of the item opposite the direction of insertion of the item into the bore;
   pulling the body along the path;
   cutting off the inserted end of the item from the item to form a cut end; and
   displacing the cut end of the item through the bore in the direction of insertion to eject the cut end from the body.

2. A method according to claim 1, further including removing a cap from the body to permit ejection of the cut end.

3. A method according to claim 1, wherein the elongated item is a wire or cable.

4. A method for pulling an elongated item through a path, the method comprising:
   inserting an end of the item into the bore of a body having a plurality of pivoting teeth, the teeth pivotably mounted to the main body by plurality of hinge pin and projecting generally inward into the bore;
   applying a pulling force to the item so that the pivoting teeth clamp on the item to apply a resistive force in the pulling direction; and
   pulling the item with a pulling device attached to the body.

5. A method for pulling an elongated item, the method comprising:
   inserting the item into a first end of a housing toward a second end of the housing;
   retaining the item in the housing with a one-way retaining device having a plurality of moveable gripping members mounted at multiple locations that prevents the item from being retracted from the first end of the housing;
   pulling the housing in the direction of insertion so as to also pull the retained item in the same direction; and
   moving at least part of the item out of the second end of the housing to disengage the item from the housing.

6. The method of claim 5, further comprising:
   cutting the item so as to separate the portion of the item being retained in the housing from the remainder of the item, and
   moving the retained portion of the item out of the second end of the housing to disengage the item from the housing.

7. The method of claim 5, wherein the item is a cable.

8. The method of claim 5, wherein the item is a wire.

9. A method of releasably gripping an elongated member to allow the elongated member to be pulled through at least one space with the use of a gripping device having a body with first and second ends, a bore extending through the body from the first end to the second end and a plurality of teeth projectable inwardly into the bore at multiple locations, the plurality of teeth being pivotably movable relative to the body, the method comprising:
   inserting the elongated member into the bore at the first end of the body in the direction of the second end of the body;
   moving one among the elongated member, relative to the body, in the direction of the first end of the body and the body, relative to the elongated member, in the direction of the second end of the body, causing at least two of said teeth to independently grip the elongated member and prevent the elongated member from being retracted out the first end of the bore; and
   pulling the gripping device in a manner in which movement of the second end of the body precedes movement of the first end of the body, whereby the elongated member is pulled along with the body.

10. The method of claim 9, further including arranging different groups of teeth in different circumferential rows in the body, whereby adjacent teeth on adjacent circumferential rows are axially offset relative to one another.

11. The method of claim 9, wherein an end of the elongated member is inserted into the bore.

12. The method of claim 11, further including easily removing the elongated member from the body and inserting another elongated member into the bore at the first end of the body in the direction of the second end of the body for reuse of the gripping device.

13. The method of claim 12, further including
   cutting the elongated member to separate the portion of the elongated member being retained in the body from the remainder of elongated member, and
   removing the retained portion of the elongated member through the bore out the second end of the body.

14. The method of claim 9, further including connecting the gripping device to at least one pulling device.

15. The method of claim 14, further including
engaging at least one attachment device to the body, the at least one attachment device being capable of facilitating pulling the body, and
engaging the at least one attachment device to the pulling device.

16. The method of claim 15, wherein the at least one attachment device is removably engageable with the body, further including removing the at least one attachment device to remove the elongated member from the body.

17. The method of claim 16, wherein the at least one attachment device includes a cap threadably engageable with the body.

18. The method of claim 9, further including pulling the body in conditions under which the elongated member is under substantial pulling stresses.

19. The method of claim 9, wherein the elongated member includes an outermost layer and at least one inner layer, further including at least some of the plurality of teeth entirely penetrating the outermost layer of the elongated member without substantially penetrating the at least one inner layer of the elongated member.

20. The method of claim 19, wherein the elongated member includes at least one fiber optics cable.

21. The method of claim 19, wherein the elongated member includes a telecommunications wire.

22. The method of claim 9, wherein multiple elongated members are being pulled simultaneously by multiple connected respective pulling devices simultaneously through the same space.

23. A method of releasably engaging a plurality of elongated members to allow the elongated members to be simultaneously pulled through at least one space with the use of a plurality of gripping devices, each gripping device having a plurality of one-way retaining devices, each one-way retaining device having a plurality of moveable gripping members mounted at multiple locations and being movable relative to said respective gripping device, the method comprising:
inserting each elongated member into a respective gripping device;
engaging each elongated item with at least two one-way retaining devices of the associated gripping device, whereby the elongated items are gripped by the associated one-way retaining devices;
positioning the gripping devices in spaced axial relationship with each other; and
generally simultaneously pulling the plurality of gripping devices through the at least one space, whereby the gripping devices pull the elongated items through the at least one space.

24. The method of claim 23, further including attaching at least one pulling device to the gripping devices to allow pulling the gripping devices through at least one path.

25. The method of claim 23, wherein each gripping device has a bore, further including pivotably mounting each of the one-way retaining devices to a gripping device, the one-way retaining devices being capable of projecting generally inwardly into the associated bore.

26. The method of claim 25, wherein each one-way retaining device includes a tooth having at least one point.

27. The method of claim 26, wherein the teeth that are engaged with an elongated member allow movement of the elongated item in a first direction in the bore relative to the gripping device and prevent movement of the elongated member in the opposite direction.

* * * * *

UNITED STATES PATENT AND TRADEMARK OFFICE
CERTIFICATE OF CORRECTION

| | | |
|---|---|---|
| PATENT NO. | : 7,246,789 B2 | Page 1 of 1 |
| APPLICATION NO. | : 11/068386 | |
| DATED | : July 24, 2007 | |
| INVENTOR(S) | : Ames et al. | |

It is certified that error appears in the above-identified patent and that said Letters Patent is hereby corrected as shown below:

On the Title Page, please insert

--     Related U.S. Application Data

Continuation of Application No. 10/405,083, filed on Apr. 2, 2003, now Pat. No. 6,883,782.

Provisional Application No. 60/407,559, filed on Aug. 30, 2002. --

In Claim 4, col. 7, line 66, please delete "by plurality of hinge pin" and substitute -- by a plurality of hinge pins" --.

Signed and Sealed this

Twenty-seventh Day of May, 2008

JON W. DUDAS
*Director of the United States Patent and Trademark Office*